H. L. DE ZENG.
OPTICAL INSTRUMENT.
APPLICATION FILED JAN. 3, 1913.
1,087,532.
Patented Feb. 17, 1914.
2 SHEETS—SHEET 2.
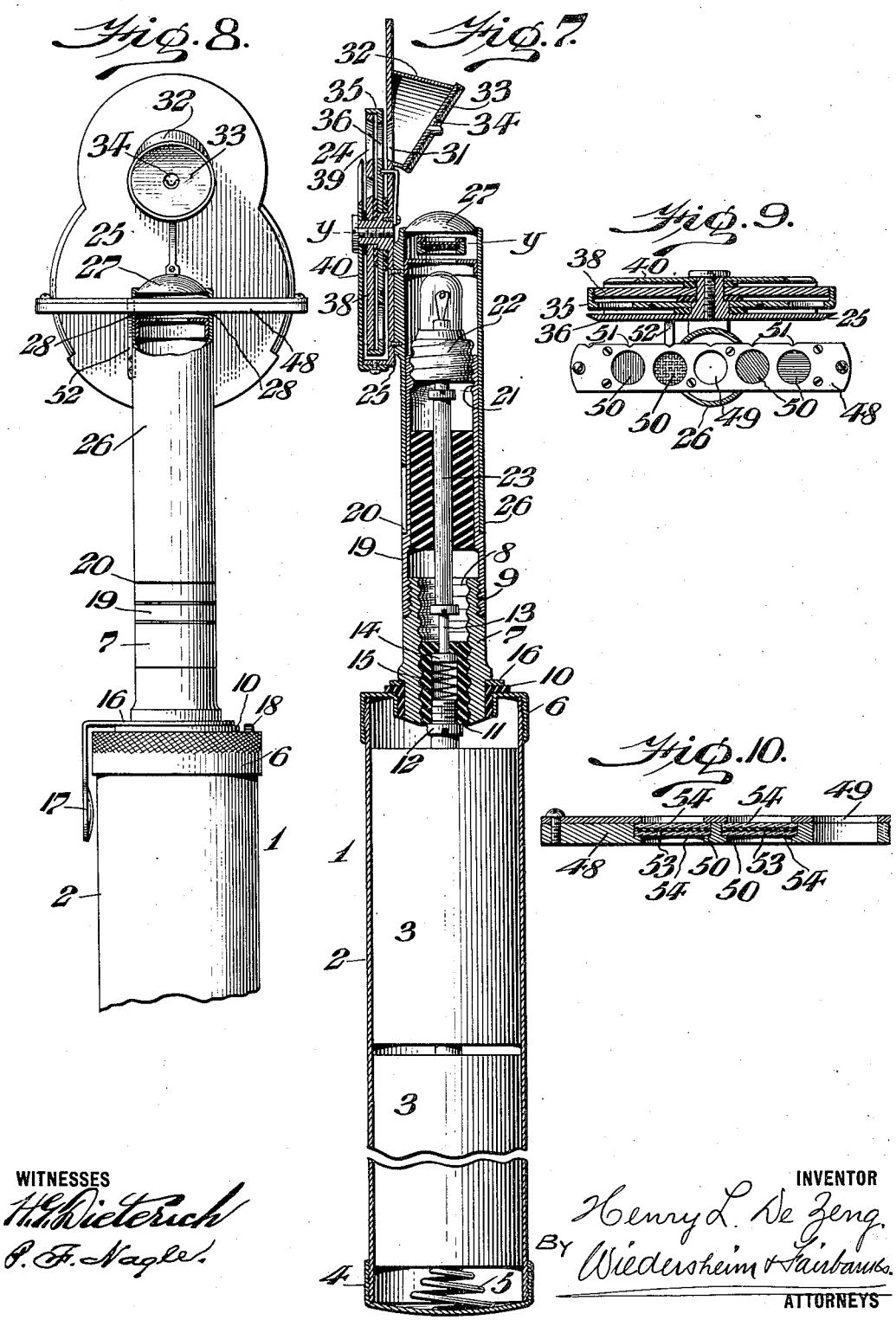
WITNESSES
H. H. Dieterich
P. F. Nagle
INVENTOR
Henry L. De Zeng
BY Wiedersheim & Fairbanks
ATTORNEYS

UNITED STATES PATENT OFFICE.

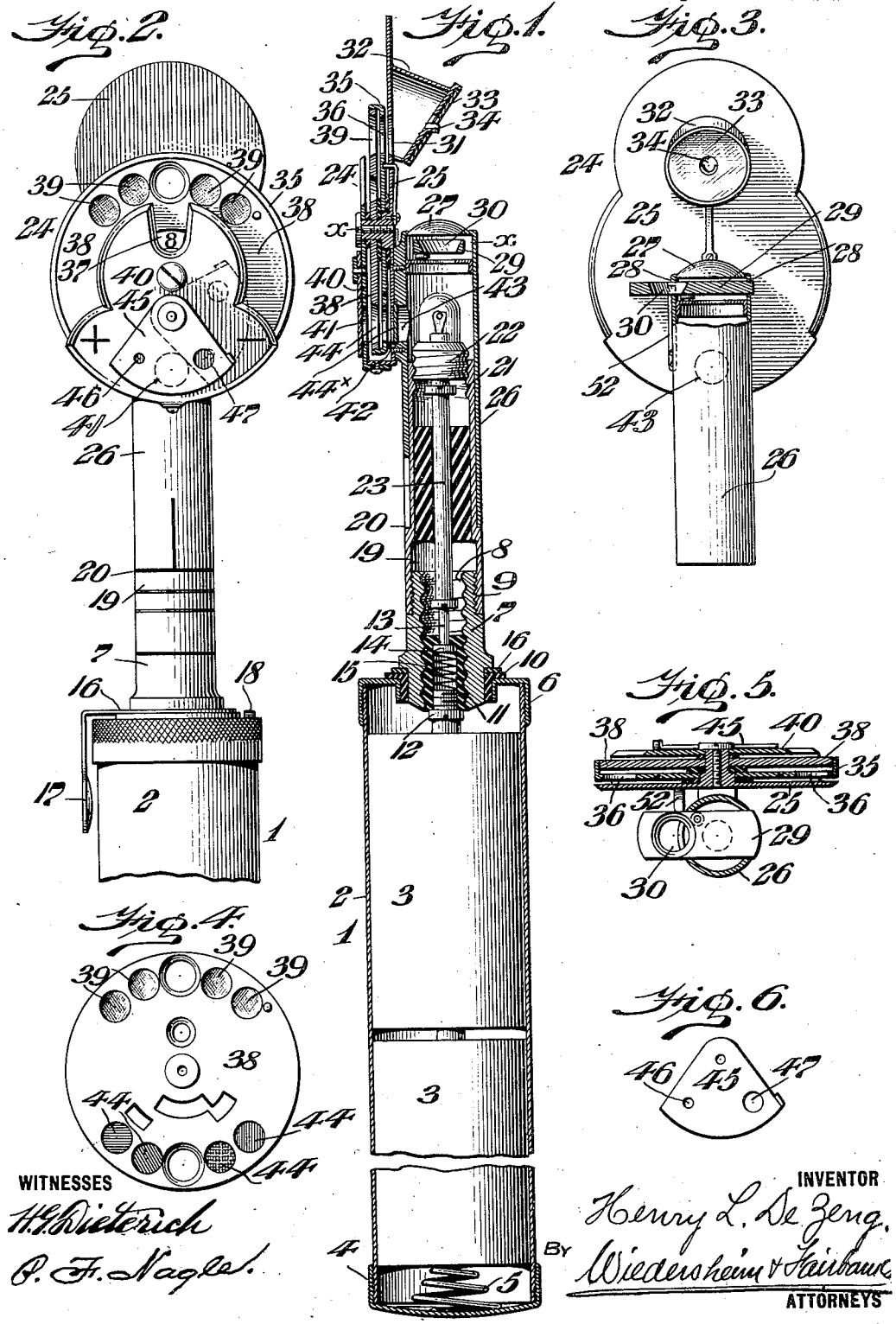

HENRY L. DE ZENG, OF MAPLE SHADE, NEW JERSEY.

OPTICAL INSTRUMENT.

1,087,532.  Specification of Letters Patent.  Patented Feb. 17, 1914.

Application filed January 3, 1913. Serial No. 739,601.

*To all whom it may concern:*

Be it known that I, HENRY L. DE ZENG, a citizen of the United States, residing at Maple Shade, in the county of Burlington, State of New Jersey, have invented a new and useful Optical Instrument, of which the following is a specification.

My invention relates to a new and useful optical instrument wherein I provide light filters or color producing media, which are adapted to transmit light, from a suitable light source, in different colors.

It further consists of an optical instrument having a handle and a source of light carried thereby and color producing media adapted to be brought into operative relation with respect to said source to transmit light therefrom in different colors.

It further consists of an optical instrument and color producing media adapted to transmit light from a suitable source in different colors, and with means for varying the volume of light therefrom.

It further consists of other novel features of construction, all as will be hereinafter fully set forth.

Figure 1 represents a vertical sectional view of an optical instrument embodying my invention. Fig. 2 represents a front elevation of a portion thereof. Fig. 3 represents a rear elevation of a portion of the device. Fig. 4 represents an elevation of one of the disks employed, in detached position. Fig. 5 represents a sectional view on line x—x Fig. 1. Fig. 6 represents a detailed view of a shutter employed, in detached position. Fig. 7 represents a vertical sectional view of an optical instrument, showing a slightly different construction. Fig. 8 represents a rear elevation of a portion thereof. Fig. 9 represents a sectional view on line y—y Fig. 7. Fig. 10 represents a longitudinal section of the slide shown in Figs. 7, 8 and 9.

Similar numerals of reference indicate corresponding parts in the figures.

Referring to the drawings my invention is designed to provide means for color tests in connection with optical instruments and more particularly with ophthalmoscopes, and in the drawings I have shown a construction which I have found operates successfully in practice, but it will be evident that changes may be made in the construction, the arrangement of the parts may be varied, and other instrumentalities may be employed which will come within the scope of my invention, and I do not thereby desire to be limited in every instance to the exact form, as herein shown and described, but desire to make such changes as may be necessary.

1 designates a handle formed of a casing 2, providing a chamber for the reception of a self-contained source of current supply, such as a suitable battery 3. One end of the casing is provided with a closure or cap 4 against which bears a suitable spring 5, or other suitable resilient means, which is likewise adapted to bear against and support the battery 3, to hold the same in suitable position for contact. The opposite end of the casing is provided with a cap or closure 6 to which is suitably connected attaching means 7, here shown as a tube. I preferably desire to provide the said tube 7 with the exterior threads 9 and with the interior threads 8, whereby it will be understood that the handle may thus be adapted for use with any suitable instrument, while the interior threads of the tube are adapted for connection with a lamp, if desired. Between the cap 6 and the attaching means 7 is provided an insulation 10, while along the interior of the attaching means or tube 7 is a tubular insulation 11, which is adapted to receive a threaded pin 12, which is adapted to be in contact with one pole of the battery 3.

13 designates an electric conductor having a head 14 thereon, which is in suitable engagement with shoulders upon the tubular insulation 11 and between the electric conductor 13 and the threaded pin 12 is a spring 15 which serves as a conductor and as a resilient bearing for the conductor 13, as will be evident. In suitable contact with the attaching means 7 is a current interrupter 16 which has a thumb-piece 17 preferably of spring material, and which thumb-piece is suitably located, as here shown, adjacent the upper end of the casing 2, whereby it will be understood that said thumb-piece 17 of the current interrupter is suitably located for the supporting hand of the operator, and can be pressed into contact with the casing 2 which is preferably of metal, as will be evident, in order to close the circuit.

It will be understood that the current interrupter 16 is movably mounted with respect to the attaching means in order that it can be rotated and so may be brought into contact with the lug 18 carried by the closure 6, in order that a permanent contact and closing of the circuit may be effected, if desired, without the necessity of pressing in the thumb-piece 17, for this purpose.

As here shown, I have connected to the exterior threads of the attaching means 7, a sleeve 19, having a suitable shoulder 20 at a suitable point on the exterior thereof, and being provided with threads 21 for the reception and engagement with a source of light 22, such as a lamp, while carried by said sleeve is a conductor rod 23 which is adapted to contact with the conductor of the attaching means, and also with a pole of the lamp 22, as will be evident.

24 designates an ophthalmoscope, which is one form of instrument which is adapted to be used and is particularly applicable for use with the handle, 1, said ophthalmoscope consisting of a body portion or support 25 which is suitably connected with a tube 26 adapted for movement or adjustment upon the sleeve 19, whereby the position of the ophthalmoscope with respect to the source of light may be varied. The tube 26 is provided with a condenser 27 which is situated preferably at its upper end, and in the walls of the tube, I provide the slots 28 for the reception of a slide or plate 29, which, at a suitable point, is provided with an opening 30 in order that I may be enabled to control the light from the light source with respect to the condenser, that is to say, when the blank portion of the plate is moved to a position between the light source and the condenser, no light can pass through the latter, while when the opening 30 is moved to a position in operative relation to the condenser, the light can pass therethrough to the reflector. At a suitable point in the body portion or support 25, preferably at the upper portion thereof, I provide the sight opening 31 and upon the rear face of the plate, at a suitable point with respect to said sight opening 31, is mounted a tube 32 carrying a mirror or reflector 33 which is also provided with a sight opening 34, it being understood that the said reflector is suitably positioned with respect to the light source 22 and the condenser 27, in order that the rays of light may be directed upon said reflector to be reflected thereby to the desired point, as is customary. Rotatably mounted upon the body portion or support 25 is a disk 35 having a series of lenses 36 and any desired number of blank openings, whereby it will be understood that the disks or the blank openings may be successively or routinely brought into register with the sight opening for the purpose of making the desired tests, said disk being provided with suitable notations 37, that may be desired or necessary. Movably mounted, upon a suitable pivot, with respect to the disk 35 and the body portion or support 25, is a second disk 38 which is likewise provided with a series of lenses 39 and a suitable number of blank openings, which lenses and openings may likewise be moved to be brought into suitable operative relation with respect to the sight opening 31, and said disk may also be provided with any suitable notations as may be desired or necessary.

Carried by or forming part of the body portion or support 25 is a front plate 40, which is provided with an opening 41 which is in register with an opening 42 in the body portion or support 25, which latter opening is in register with an opening 43 in the tube 26, it being understood that said openings constitute a light opening, which is lateral to said light source and may be moved or adjusted with respect to said light source by the movement of the tube 26 on the sleeve 19, so that the said light opening may be positioned near to or farther away from the light source, as may be desired, in order to vary the volume of light passing said light opening. At a suitable point in the second disk 38, I mount color producing media or light filters 44 of any desired number and quality in order to accomplish the desired tests, for example, where it is desired to make tests for the visual and color sense of the entire retinal field and in searching for blind areas, which would be difficult to discover with the ophthalmoscope or other means, and as here shown, I have provided the colors, blue, green, yellow and red, and in addition, a plain opening, for the ordinary white light, so that it will be understood that by the proper rotation or movement of the second disk 38, the desired color media may be placed or brought into operative relation with respect to the light opening, and the light from the light source will be projected or transmitted in different colors, depending on the color producing media then in register with the said light opening.

It is preferably desired to diffuse the light from the light source to the color producing media, and any suitable means for accomplishing this result may be provided. As here shown, I have mounted a frosted disk 44$^x$ on the body portion or support 25 and in the opening therein for this purpose. In some instances, it may be of advantage to vary the size of the light opening and to control the light passing from said light opening and for this purpose, I have here shown a shutter 45 which is pivotally mounted upon the front plate 40, in order to be moved into various positions with respect to the light opening, and which is provided with a plurality of different sized openings, here shown as 46 and 47, respectively, at suitable points, in order that any one of said different sized openings may be located in register with the light opening 41, in the front plate to vary the size thereof, or the blank portion of the shutter 45 may be placed over the light opening so that no light can pass therethrough.

It will, of course, be understood that by the proper movement of the slide 29, the light from the light source can be entirely cut off from the reflector during the operation with the color producing media, and that when it is desired to use the instrument as an ophthalmoscope, the opening 30 in the slide 29, is moved to position in register with the condenser 27, so that the light will pass therethrough to the reflector 33, and the shutter 45 is moved over to close the light opening to prevent the passage of light therethrough. As previously stated, by adjusting the position of the tube 26 on the sleeve 19, the opening 43 in the tube 26 may be moved toward or away from the source of light, so that the volume of light passing through said light opening will vary or may be governed as will be evident.

In the construction shown in Figs. 7, 8, and 9, I have shown a construction which operates in a similar manner to that already described, excepting that I omit the light opening, and in place of mounting the color producing media upon one of the disks of the ophthalmoscope, I provide a plate or slide 48 which is slidingly mounted in the tube 26, said plate having the opening 49 free from color producing media and said plate having, suitably mounted therein, the color producing media 50 which may be of any desired color, as here shown, the same being blue, green, yellow and red, so that by the proper movement of the plate or slide 48, the free opening 49 may be brought to a position in operative relation with respect to the condenser 27 and the light source, so that the ordinary rays of light are transmitted from the source of light 22 to the reflector, but when any of the color producing media are brought to a position in operative relation with respect to said light source, it will cause the light rays of a desired color to be transmitted to said reflector. I have provided the nicks or recesses 51 in the side of the plate 48 which are adapted to be engaged by the spring finger or stop 52 for suitably holding the plate 48 in its different positions.

In Fig. 10, I have shown the preferred form of my color producing media, which consists of a film 53 of coloring material, and I have mounted the same between the two glass disks or plates 54, so that the said films 53 are protected, but serve to produce and transmit colored rays of exactly the proper color.

While I do not desire to be limited to any form of color producing media, the one shown and described above is that which I have found in practice accomplishes the desired results in the most satisfactory and positively accurate manner, it being understood that any suitable means may be employed for mounting the same in the disk or slide, and that by reason of the glass disk or plates, the sensitive and fragile film is thoroughly protected, and impairment of its coloring properties is prevented.

Having thus described my invention, what I claim as new and desire to secure by Letters Patent, is:—

1. In an ophthalmoscope, a reflector, a sight opening, lenses adapted to register with said sight opening and a light filter, adapted to transmit colored light, suitably supported with respect to said ophthalmoscope and adapted to be brought into operative position.

2. In an ophthalmoscope, a reflector, a sight opening, a series of lenses adapted to register with said sight opening, and light filters suitably supported on said ophthalmoscope and adapted to be positioned to transmit light in different colors.

3. In an ophthalmoscope, a reflector, a sight opening, lenses adapted to be brought to register with said sight opening, a source of light, light filters and means for transmitting light from said source through said filters.

4. In an ophthalmoscope, a source of light, a light opening, light filters adapted to be positioned in operative relation with respect to said light opening, and means for governing the light passing said light opening.

5. In an ophthalmoscope, a handle, a source of light carried thereby, light filters adapted to transmit light from said source, in different colors, and means for governing the light transmitted.

6. In an ophthalmoscope, a source of light, and a series of light filters adapted to be positioned in operative relation with respect to said light source.

7. In an ophthalmoscope, a source of light, a sight opening, a series of lenses adapted to be brought into registration with said sight opening, light filters, and means for movably supporting said light filters whereby the same may be brought into operative relation with respect to said light source.

8. In an ophthalmoscope, a source of light, a light opening, a series of light filters adapted to be positioned into operative relation with respect to said source and said light opening, and means adapted to be positioned to control the light rays from said light opening.

9. In an ophthalmoscope, a source of light, a light opening, a series of light filters adapted to be brought into operative relation with respect to said light opening, and means adapted to be positioned for varying the size of said light opening.

10. In an ophthalmoscope, a source of light, a reflector suitably located with respect to said light source, means adapted to be actuated for controlling the passage of light to said reflector, a light opening, a series of light filters adapted to be brought into operative relation with respect to said light opening, and means adapted to control the light transmitted by said light opening.

11. In an ophthalmoscope, a source of light, a series of light filters adapted to be positioned in operative relation with respect to said light source, and means for diffusing the light from said light source.

12. In an ophthalmoscope, a source of light, a reflector and a condenser located between said light source and reflector, a light opening adapted to receive light from said source, and a series of light filters adapted to be positioned in operative relation with respect to said light opening.

13. In an ophthalmoscope, a source of light, a reflector and a condenser located between said light source and said reflector, means controlling the light from said source to said reflector, a light opening lateral to said light source, a series of light filters adapted to be positioned in operative relation with respect to said light opening, and means controlling the light transmitted by said light opening.

14. In an optical instrument, a handle, a source of light carried thereby, a light opening and light filters adapted to register with said light opening to transmit light from said source, in different colors.

15. In an ophthalmoscope, a source of light, a reflector, and light filters adapted to be positioned in operative relation with respect to said light source to cause light rays of a desired color to be transmitted to said reflector.

16. In an ophthalmoscope, a source of light, a condenser, a reflector, and light filters movably mounted between said light source and said reflector, whereby any of said filters may be positioned in operative relation with respect to said light source and said reflector.

HENRY L. DE ZENG.

Witnesses:
C. D. McVay,
F. A. Newton.